(12) United States Patent
Li et al.

(10) Patent No.: US 8,386,764 B2
(45) Date of Patent: Feb. 26, 2013

(54) BIOS ARCHITECTURE

(75) Inventors: Cheng-Wei Li, Shanghai (CN);
Xiong-Jie Yu, Shanghai (CN);
Tsu-Cheng Lin, Taipei (TW)

(73) Assignee: Inventec Corporation, Taipei (TW)

( * ) Notice: Subject to any disclaimer, the term of this patent is extended or adjusted under 35 U.S.C. 154(b) by 501 days.

(21) Appl. No.: 12/688,917

(22) Filed: Jan. 18, 2010

(65) Prior Publication Data

US 2011/0179211 A1 Jul. 21, 2011

(51) Int. Cl.
*G06F 9/00* (2006.01)

(52) U.S. Cl. ............... 713/100; 713/1; 713/2; 717/168; 717/171

(58) Field of Classification Search ................ 713/1, 2, 713/100; 717/168, 171
See application file for complete search history.

(56) References Cited

U.S. PATENT DOCUMENTS

| | | | |
|---|---|---|---|
| 2006/0212694 A1* | 9/2006 | Koizumi | 713/2 |
| 2007/0288737 A1* | 12/2007 | Boyle | 713/1 |
| 2009/0132799 A1* | 5/2009 | Brumley et al. | 713/100 |
| 2010/0228960 A1* | 9/2010 | Huang et al. | 713/100 |

FOREIGN PATENT DOCUMENTS

| | | |
|---|---|---|
| CN | 101030867 A | 9/2007 |
| CN | 101373433 A | 2/2009 |
| CN | 101373451 A | 2/2009 |

\* cited by examiner

*Primary Examiner* — Paul Yanchus, III
(74) *Attorney, Agent, or Firm* — CKC & Partners Co., Ltd.

(57) ABSTRACT

A BIOS architecture adapted in a computer system is provided. The BIOS architecture includes at least one BIOS, a programmable chip module, a baseboard management controller (BMC), a south bridge chip and a network interface controller (NIC). The NIC is connected to the south bridge chip and the BMC and is to receive a remote update data to determine the destination of the remote update data. When the destination of the remote update data is the south bridge chip, the south bridge chip updates the BIOS according to the remote update data. When the destination of the remote update data is the BMC, the NIC informs the BMC to receive the remote update data, such that the BMC controls the programmable chip module to update the BIOS according to the remote update data.

10 Claims, 5 Drawing Sheets

BIOS ARCHITECTURE

FIELD OF THE INVENTION

The disclosure relates to an electronic digital data processing technique, and more particularly to a basic input/output system (hereinafter referred to as the "BIOS") architecture.

BACKGROUND OF THE INVENTION

BIOSes are very important modules in computer systems. During the start up process, the computer system has to initialize hardware devices according to the setting of the BIOS, such that the computer system can operate the hardware devices after the operating system is running.

The BIOSes include content of different versions developed by manufacturers. The user can decide whether to update or not. The general ways of online update refers to the way that the BIOS is updated through a south bridge chip when the computer system operates. However, because the south bridge chip controls the signal transmission of a lot of hardware devices, the user will feel the operation of the computer system becomes very slow when the south bridge chip gathers up resources to update the BIOS. Moreover, the whole computer system sometimes cannot respond to the requests of any user or other signals at the time of updating, so that the system needs to pause to update the BIOS.

Therefore, it is an urgent issue for manufacturers to design a new BIOS architecture to prevent the operation of the computer system from becoming slow when burning and updating through the south bridge chip.

SUMMARY OF THE INVENTION

Therefore, one aspect of the present invention is to provide a BIOS architecture adapted in a computer system. The BIOS architecture includes at least one BIOS, a programmable chip module, a baseboard management controller (hereinafter referred to as the "BMC"), a south bridge chip and a network interface controller (hereinafter referred to as the "NIC"). The programmable chip module is connected to the BIOS. The BMC is connected to the programmable chip module. The south bridge chip is connected to the BIOS. The NIC is connected to the south bridge chip to connect the computer system to a network. The NIC is further connected to baseboard management controller. When the NIC receives a remote update data, the NIC determines the destination of the remote update data is the BMC or the south bridge chip. When the destination of the remote update data is the south bridge chip, the south bridge chip updates the BIOS according to the remote update data. When the destination of the remote update data is the BMC, the NIC informs the BMC to receive the remote update data, such that the BMC further controls the programmable chip module to update the BIOS according to the remote update data.

According to another embodiment of the present disclosure, the BIOS architecture further includes a temporary memory connected to the programmable chip module. When the NIC informs the BMC to receive the remote update data, the temporary memory is used to receive and store the remote update data, such that when the remote update data is complete, the programmable chip module updates the BIOS according to the remote update data. The BMC further determines whether the temporary memory includes a backup update data before receiving the remote update data. When the temporary memory includes the backup update data, the BMC updates either the remote update data or the backup update data. The temporary memory is an electrically erasable programmable read only memory (EEPROM) or a flash memory. The BMC performs a checksum step on the remote update data of the temporary memory to determine whether the remote update data is complete.

According to still another embodiment of the present disclosure, the BIOS architecture substantially includes a plurality of BIOSes, and each BIOS includes a corresponding multiplexer. The programmable chip module and the south bridge chip are substantially respectively connected to the multiplexers. The south bridge chip further generates a first selective signal to control the programmable chip module to select one of the multiplexers to update the BIOS corresponding to the multiplexer. When the remote update data is transmitted to the south bridge chip, the selected BIOS is updated through the south bridge chip by the remote update data. When the remote update data is transmitted to the BMC, the NIC informs the BMC to receive the remote update data, and the BMC further controls the programmable chip module to update the selected BIOS according to the remote update data. The south bridge chip further generates a second selective signal to control the programmable chip module to select one of the BIOSes to make the computer system start up according to the BIOS.

According to still further another embodiment of the present disclosure, the programmable chip module is a complex programmable logic device (CPLD) or a programmable integrated circuit (PIC). The BMC communicates with the programmable chip module through an intellectual platform management interface (IPMI).

The advantages of applying the present disclosure are that the BIOS can be updated through two different update paths including an update path including the programmable chip module and the BMC and another update path including the south bridge chip, to prevent the computer system from being slow when the updating procedure is performed only through the south bridge chip, so that a more flexible update method can be selected to achieve the aforementioned objectives.

BRIEF DESCRIPTION OF THE DRAWINGS

The foregoing and other aspects, features, advantages and embodiments of this disclosure are more readily appreciated as the same become better understood by reference to the following detailed description, when taken in conjunction with the accompanying drawings, wherein.

DETAILED DESCRIPTION OF THE PREFERRED EMBODIMENT

Figure 1A:
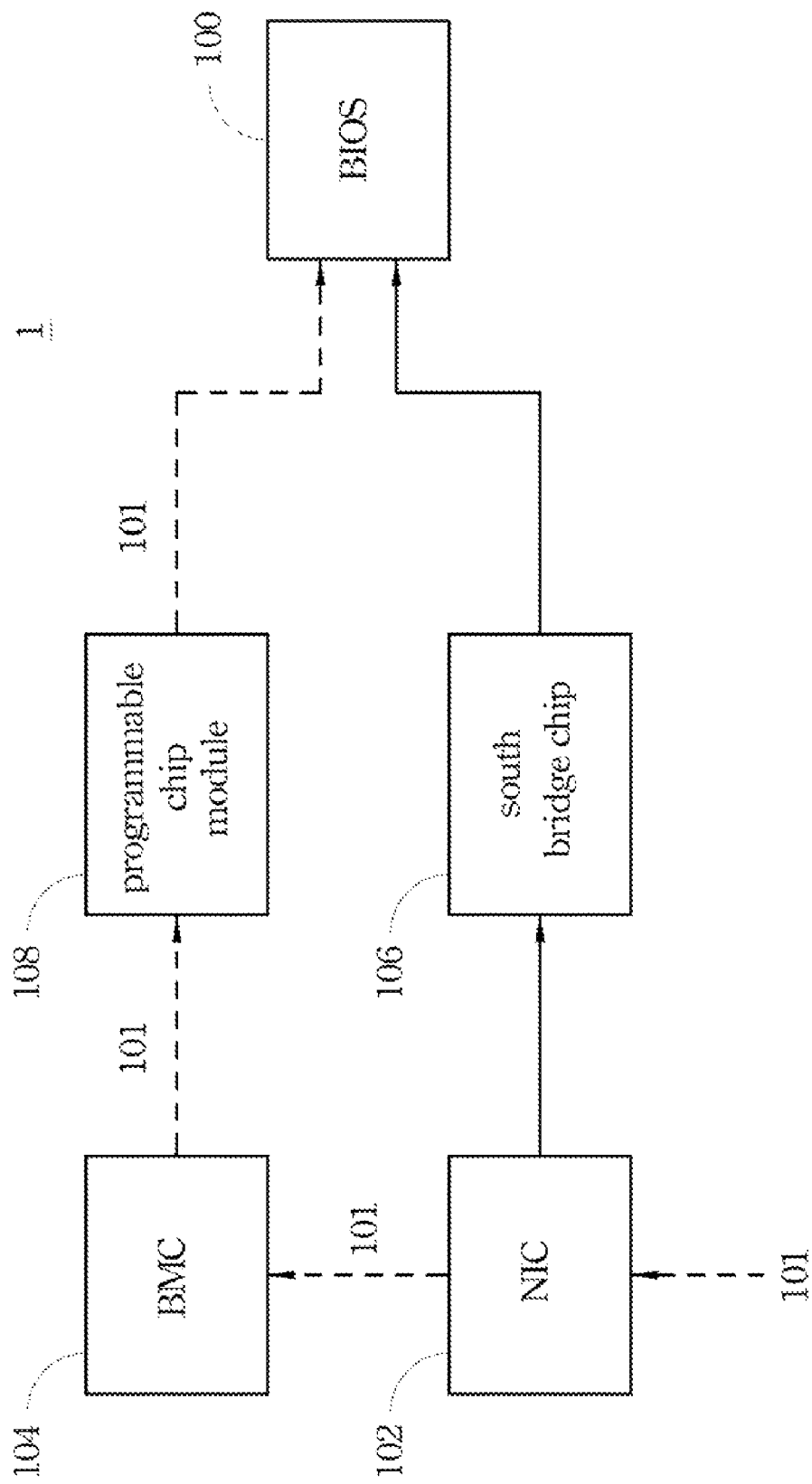
FIG. 1A illustrates a block diagram of a BIOS architecture in accordance with one embodiment of the present disclosure.

Refer to FIG. 1A. FIG. 1A illustrates a block diagram of a BIOS architecture 1 in accordance with one embodiment of the present disclosure. The BIOS architecture 1 is adapted in a computer system (not shown). The BIOS architecture 1 includes a BIOS 100, a NIC 102, a BMC 104, a south bridge chip 106 and a programmable chip module 108.

The programmable chip module 108 may be a complex programmable logic device (CPLD) or a programmable integrated circuit (PIC) in different embodiments. The programmable chip module 108 is connected to the BIOS 100. The BMC 104 is connected to the programmable chip module 108. In one embodiment, the BMC 104 communicates with the programmable chip module 108 through a smart table management interface. The south bridge chip 106 is connected to the BIOS 100.

The contents of a remote update data 101 are update data that can be burned into the BIOS 100. The contents of the remote update data 101 may come from a remote mainframe (not shown), is transmitted to the computer system by a network transmission method and is received by the NIC 102.

The NIC 102 is connected to the south bridge chip 106 and is used to connect the computer system to the network. The NIC 102 is further connected to the BMC 104. After the NIC 102 receives the remote update data 101, the NIC 102 determines that the destination of the remote update data 101 is the BMC 104 or the south bridge chip 106. When the destination of the remote update data 101 is the BMC 104, the NIC 102 informs the BMC 104 to receive the remote update data 101. In one embodiment, the NIC 102 informs the BMC 104 to receive the remote update data 101 by a sideband communication mode, and the NIC 102 is connected to the BMC 104 through an intel-integrated circuit (12C) bus. After the BMC 104 receives the remote update data 101, the BMC 104 controls the programmable chip module 108 to update the BIOS 100 according to the remote update data 101.

Therefore, when the destination of the remote update data 101 is the BMC 104, the BIOS 100 is updated through the path indicated by dotted lines in FIG. 1A according to the remote update data 101.

Figure 1B:
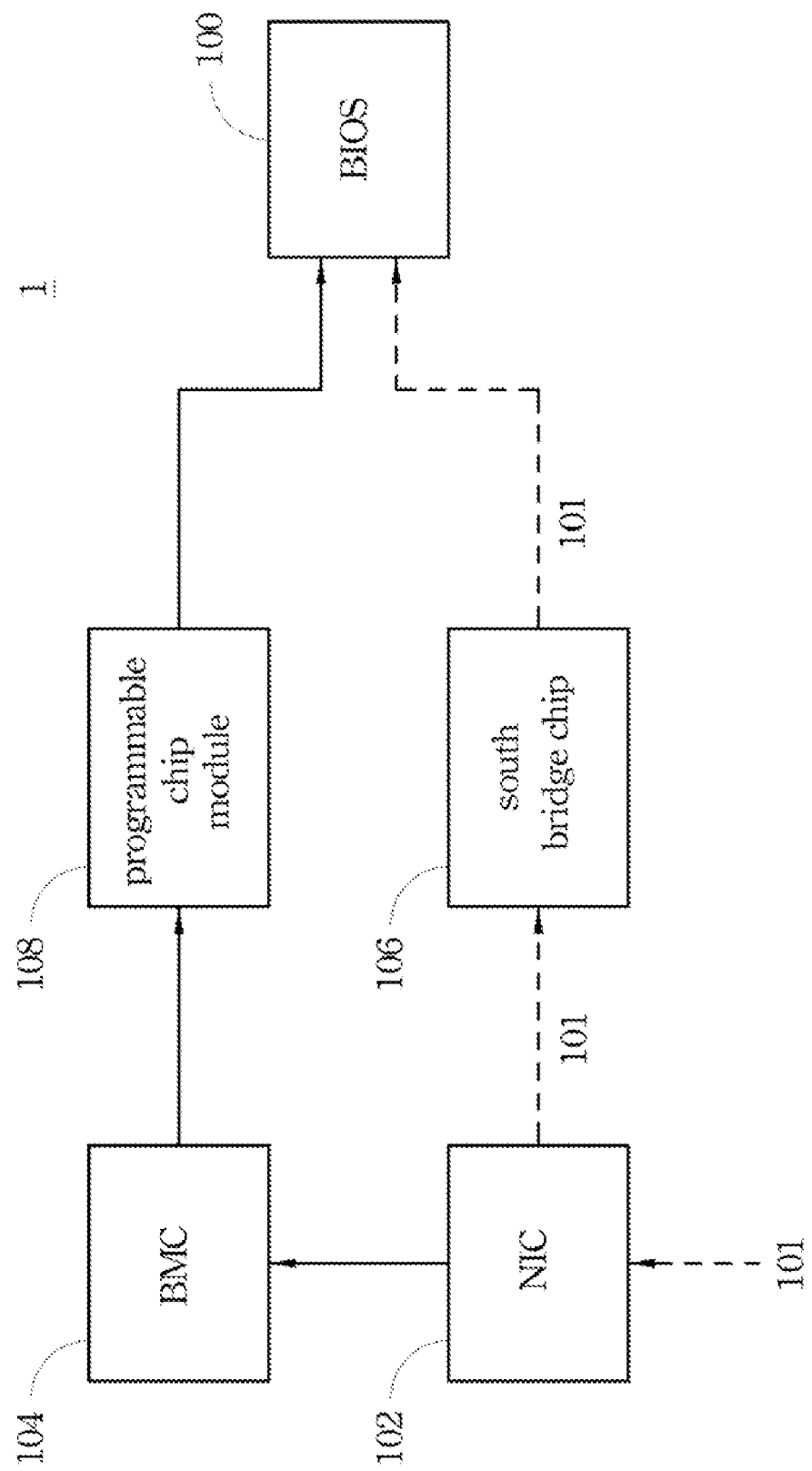
FIG. 1B illustrates a block diagram of a remote update data of the BIOS architecture in FIG. 1A, which updates the BIOS through a south bridge chip.

When the destination of the remote update data 101 is the south bridge chip 106, the BIOS 100 is updated through the path indicated by dotted lines in FIG. 1B by the south bridge chip 106 according to the remote update data 101. In one embodiment, a connection interface between the south bridge chip 106 and the NIC 102 is a peripheral component interconnection express (PCI Express).

In the update method, which is performed by using a network to transmit through the south bridge chip 106, the south bridge chip 106 needs to control the signals of other systems simultaneously, so that the operation of the computer system is easily affected during update. In addition, the update procedure has to be updated in a start up operation state of the computer system. In the BIOS architecture 1 in the aforementioned embodiment, the BIOS 100 can be updated through the connection of the BMC 104 and the programmable chip module 108 by disposing the programmable chip module 108, and is updated not only through the south bridge chip 106. The BMC 104 is operated independently from the computer system. When the computer system is in a close state, the BMC 104 is still in an operation state. Therefore, the updating can be performed without affecting the operation of the computer system, and can also be performed when the computer system is in a close state.

In addition, with the embodiment of sharing the NIC 102 with the south bridge chip 106, the BMC 104 is unnecessary set with a network port reserved for the BMC 104 to receive the remote update data 101.

Figure 2:
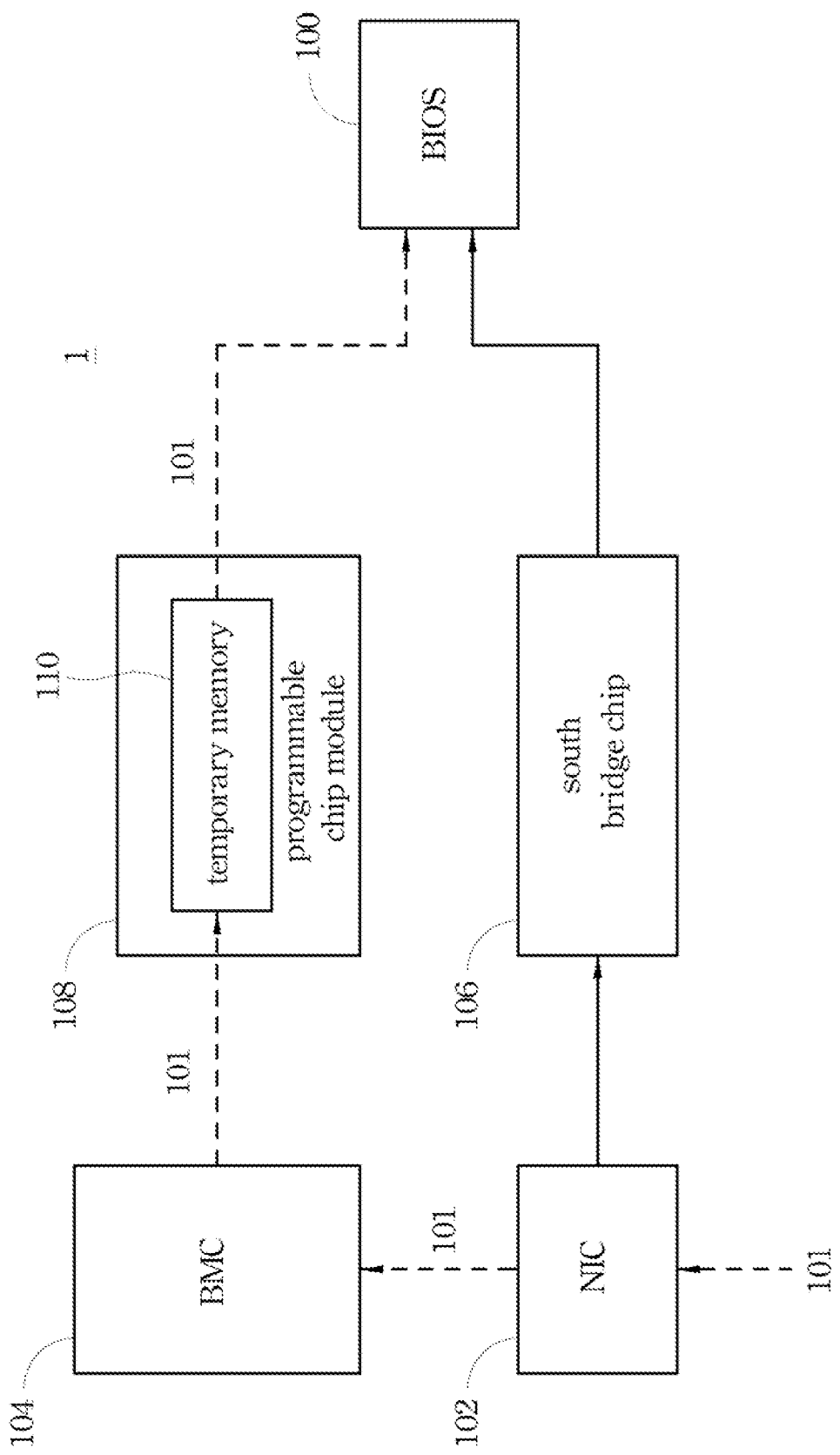
FIG. 2 illustrates a block diagram of a BIOS architecture in accordance with another embodiment of the present disclosure.

FIG. 2 illustrates a block diagram of a BIOS architecture 1 in accordance with another embodiment of the present disclosure. Compared with the BIOS architecture 1 shown in FIG. 1A and FIG. 1B, the BIOS architecture 1 of the present embodiment further includes a temporary memory 110 connected to the programmable chip module 108. In one embodiment, the temporary memory 110 may be one part of the programmable chip module 108, such as shown in FIG. 2.

When the remote update data 101 is remotely received from the network, the packets may be lost due to the network, or the packets may be transmitted incompletely resulting in the incompleteness of the received data. If the BIOS 100 is updated by using the incomplete data, an error of the system is easily caused. Therefore, when the NIC 102 informs the BMC 104 to receive the remote update data 101, the temporary memory 110 of the present embodiment receives the remote update data 101 from the BMC 104 and stores the remote update data 101. After the remote update data 101 is complete with nothing missing, the programmable chip module 108 updates the BIOS 100 according to the remote update data 101.

In one embodiment, the BMC 104 further determines whether the temporary memory 110 includes a backup update data (not shown) before receiving the remote update data 101. When the temporary memory 110 includes the backup update data, the BMC 104 updates either the remote update data 101 or the backup update data. The selection of the BMC 104 may be determined by a user through a user interface.

The temporary memory 110 may be an electrically erasable programmable read only memory (EEPROM) or a flash memory. The BMC 104 performs a checksum step on the remote update data 101 stored in the temporary memory 110 to determine whether the remote update data 101 is complete.

The BIOS architecture 1 of the present embodiment ensures the reliability of the remote update data 101 to update the BIOS 100 and to achieve the breakpoint transmission simultaneously by disposing the temporary memory 110. Furthermore, when the temporary memory 110 includes the backup update data, the user can select the better one or the newer version of the remote update data 101 and the backup update data.

Figure 3A:
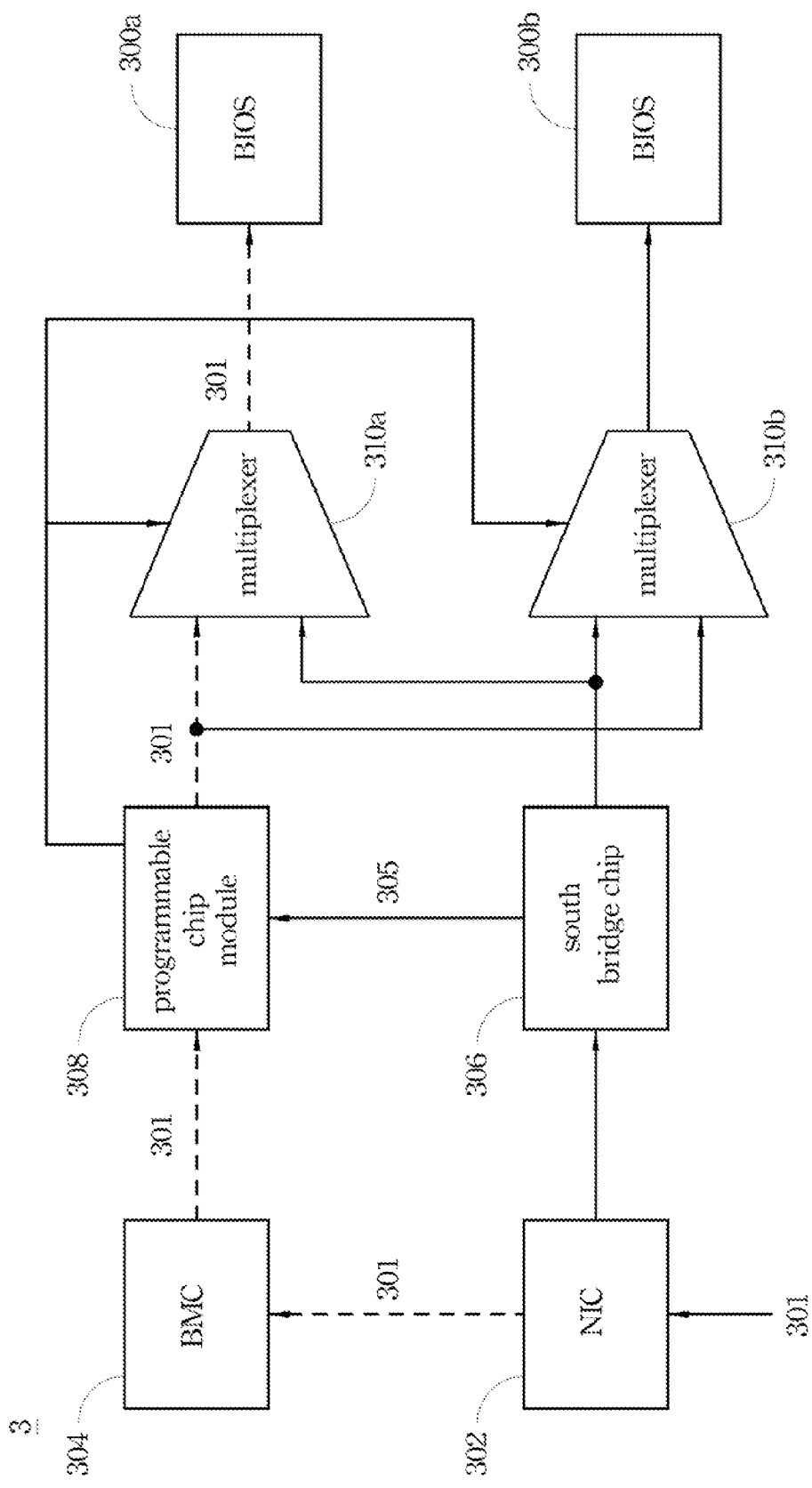
FIG. 3A illustrates a block diagram of a BIOS architecture in accordance with still another embodiment of the present disclosure.

FIG. 3A illustrates a block diagram of a BIOS architecture 3 in accordance with still another embodiment of the present disclosure. The BIOS architecture 3 includes BIOSes 300a and 300b, a NIC 302, a BMC 304, a south bridge chip 306 and a programmable chip module 308.

In the present embodiment, the devices of the BIOS architecture 3 are similar to the aforementioned embodiments, so it does not give unnecessary details for the devices. It is worthy of note that the BIOS architecture 3 of the present embodiment includes two BIOSes 300a and 300b, and two multiplexers 310a and 310b respectively corresponding to the BIOSes 300a and 300b. In other embodiments, the number of the BIOSes and the corresponding multiplexers may be adjusted according to the situations, and the present embodiment only adopts two BIOSes and two corresponding multiplexers for illustration. Various modifications and variations can be made without departing from the spirit and the scope of the present disclosure by any person skilled in the art.

The programmable chip module 308 and the south bridge chip 306 are substantially connected to the multiplexers 310a and 310b. The south bridge chip 306 further generates a first selective signal 305 to control the programmable chip module 308 to select one of the multiplexers 310a and 310b to update the BIOSes 300a and 300b respectively corresponding to the multiplexers 310a and 310b. For example, such as shown in FIG. 3A, when the NIC 302 receives a remote update data 301 to be transmitted to the BMC 304, the NIC 302 informs the BMC 304 to receive the remote update data 301. At present, if the first selective signal 305 transmitted by the south bridge chip 306 is to select the multiplexer 310a, the programmable chip module 308 controls and enables the multiplexer 310a, and controls and disables the multiplexer 310b. Therefore, the BMC 304 controls the programmable chip module 308 to transmit the remote update data 301 to the BIOS 300a through the multiplexer 310a to perform an update procedure through the path indicated by dotted lines in FIG. 3A.

Figure 3B:
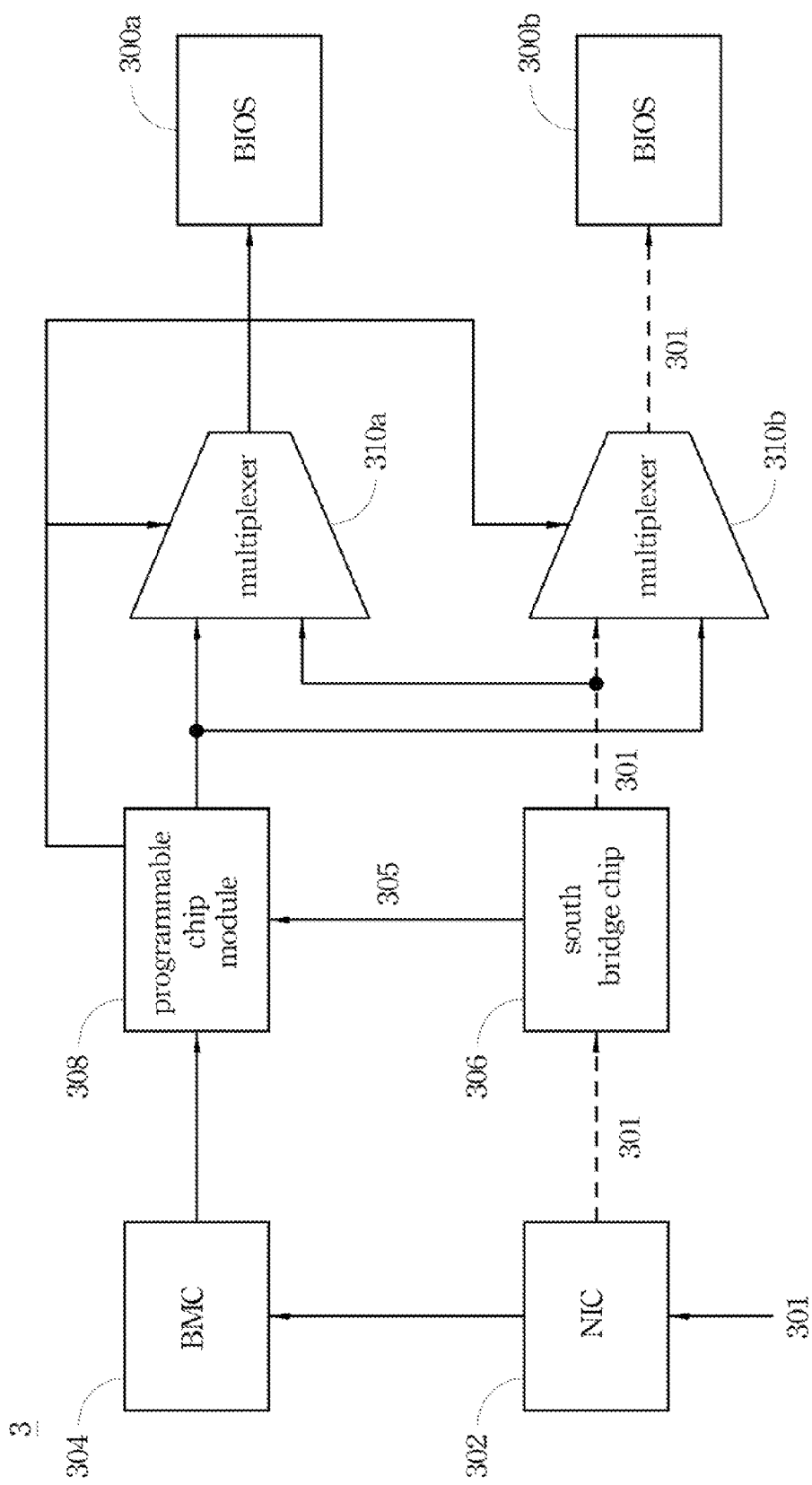
FIG. 3B illustrates a block diagram of a remote update data of the BIOS architecture in FIG. 3A, which updates the BIOS through a south bridge chip or a multiplexer.

Refer to FIG. 3B. When the NIC 302 receives a remote update data 301 to be transmitted to the south bridge chip 306, the NIC 302 transmits the remote update data 301 to the south bridge chip 306. At present, if the first selective signal 305 transmitted by the south bridge chip 306 is to select the multiplexer 310b, the programmable chip module 308 controls and enables the multiplexer 310b, and controls and disables the multiplexer 310a. Therefore, the south bridge chip 306 transmits the remote update data 301 to the BIOS 300b through the multiplexer 310b to perform an update procedure through the path indicated by dotted lines in FIG. 3B.

In other embodiments, the south bridge chip 306 may update the BIOS 300a through the multiplexer 310a, or the programmable chip module 308 may update the BIOS 300b through the multiplexer 310b. Therefore, in the BIOS architecture 3 including a plurality of BIOSes, the update path of the present disclosure has large flexibility.

Because the BIOS architecture 3 includes two BIOSes 300a and 300b, the south bridge chip 306 can further generate a second selective signal (not shown) to control the programmable chip module 308 to select one of the BIOSes 300a and 300b, such that the computer system can perform a start up procedure according to the selected. BIOS 300a or 300b, wherein the selected BIOS 300a or 300b is the basis for initializing hardware devices in the computer system. It is worthy of note that two BIOSes are adopted for illustration in the present embodiment, and in other embodiments, more than two BIOSes are disposed according to different requirements.

The advantages of the BIOS architecture and an update method of the BIOS architecture of the present disclosure are that the BIOS can be updated through two different update paths including an update path including the programmable chip module and the BMC and another update path including the south bridge chip, to prevent the computer system from being slow when the updating procedure is performed only through the south bridge chip, so that a more flexible update method can be selected.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A basic input/output system (BIOS) architecture adapted in a computer system, wherein the BIOS architecture includes:
   at least one BIOS;
   a programmable chip module connected to the BIOS;
   a baseboard management controller (BMC) connected to the programmable chip module;
   a south bridge chip connected to the BIOS; and
   a network interface controller (NIC) connected to the south bridge chip to connect the computer system to a network and further connected to the BMC, wherein when the NIC receives a remote update data, the NIC determines the destination of the remote update data is the BMC or the south bridge chip, when the destination of the remote update data is the south bridge chip, the south bridge chip updates the BIOS according to the remote update data, and when the destination of the remote update data is the BMC, the NIC informs the BMC to receive the remote update data, such that the BMC further controls the programmable chip module to update the BIOS according to the remote update data.

2. The BIOS architecture according to claim 1, further including a temporary memory connected to the programmable chip module, wherein when the NIC informs the BMC to receive the remote update data, the temporary memory is used to receive and store the remote update data, such that when the remote update data is complete, the programmable chip module updates the BIOS according to the remote update data.

3. The BIOS architecture according to claim 2, wherein the BMC further determines whether the temporary memory includes a backup update data before receiving the remote update data, and when the temporary memory includes the backup update data, the BMC updates either the remote update data or the backup update data.

4. The BIOS architecture according to claim 2, wherein the BMC performs a checksum step on the remote update data of the temporary memory to determine whether the remote update data is complete.

5. The BIOS architecture according to claim 2, wherein the temporary memory is an electrically erasable programmable read only memory (EEPROM) or a flash memory.

6. The BIOS architecture according to claim 1, substantially including a plurality of BIOSes and a plurality of multiplexers respectively corresponding to the BIOSes, wherein the programmable chip module and the south bridge chip are substantially respectively connected to the multiplexers, and the south bridge chip further generates a first selective signal to control the programmable chip module to select one of the multiplexers to update the BIOS corresponding to the selected multiplexer.

7. The BIOS architecture according to claim 6, wherein when the remote update data is transmitted to the south bridge chip, the selected BIOS is updated through the south bridge chip by the remote update data, and when the remote update data is transmitted to the BMC, the NIC informs the BMC to receive the remote update data, and the BMC further controls the programmable chip module to update the selected BIOS according to the remote update data.

8. The BIOS architecture according to claim 6, wherein the south bridge chip further generates a second selective signal to control the programmable chip module to select one of the BIOSes to make the computer system start up according to the selected BIOS.

9. The BIOS architecture according to claim 1 wherein the programmable chip module is a complex programmable logic device (CPLD) or a programmable integrated circuit (PIC).

10. The BIOS architecture according to claim 1 wherein the BMC communicates with the programmable chip module through an intellectual platform management interface (IPMI).

* * * * *